(12) United States Patent
Fu et al.

(10) Patent No.: US 8,356,351 B2
(45) Date of Patent: Jan. 15, 2013

(54) METHOD AND DEVICE FOR VERIFICATION OF CODE MODULE IN VIRTUAL MACHINE

(75) Inventors: Rong Yao Fu, Beijing (CN); Hai Tao Long, Beijing (CN); William J. Tracey, Round Rock, TX (US); David Alvra Wood, III, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1149 days.

(21) Appl. No.: 12/016,398

(22) Filed: Jan. 18, 2008

(65) Prior Publication Data

US 2008/0209556 A1    Aug. 28, 2008

(30) Foreign Application Priority Data

Jan. 19, 2007  (CN) .......................... 2007 1 0004270

(51) Int. Cl.
| | |
|---|---|
| *G06F 11/00* | (2006.01) |
| *G06F 12/14* | (2006.01) |
| *G06F 12/16* | (2006.01) |
| *G06F 7/04* | (2006.01) |
| *G06F 17/30* | (2006.01) |
| *G06F 9/45* | (2006.01) |
| *G06F 9/455* | (2006.01) |
| *G06F 11/30* | (2006.01) |
| *G08B 23/00* | (2006.01) |
| *H04N 7/16* | (2011.01) |
| *H04L 9/32* | (2006.01) |
| *H04L 29/06* | (2006.01) |

(52) U.S. Cl. ................. 726/22; 717/148; 718/1; 726/23; 726/26; 713/187; 713/172; 713/156; 713/175

(58) Field of Classification Search ..................... 726/22
See application file for complete search history.

(56) References Cited

U.S. PATENT DOCUMENTS 5,692,047 A * 11/1997 McManis ...................... 713/167
(Continued)

FOREIGN PATENT DOCUMENTS

WO    WO9834365    8/1998
(Continued)

OTHER PUBLICATIONS

Ghosh, "On Certifying Mobile Code for Secure Applications", Proceedings of the Ninth International on Software Reliability Engineering, 1998, pp. 381-403.

(Continued)

*Primary Examiner* — Nathan Flynn
(74) *Attorney, Agent, or Firm* — William Stock; Anne Vachon Dougherty

(57) ABSTRACT

A method for pre-verification of a code module when the code module is installed or updated in a virtual machine, comprising: loading codes in the installed or updated code module; performing code verification on the codes in the code module; if the code verification is passed, generating a certificate of the code module; and storing the code module passing the code verification and its certificate. The present invention also discloses a method for verification of a code module at runtime of the code module in a virtual machine, comprising loading codes in the code module; generating a certificate of the code module based on the loaded codes; if the generated certificate of the code module and a pre-stored certificate of the code module are identical, verifying the code module to be valid; otherwise performing a pre-verification on the code module.

16 Claims, 6 Drawing Sheets

U.S. PATENT DOCUMENTS

| | | | | |
|---|---|---|---|---|
| 5,724,425 | A * | 3/1998 | Chang et al. | 705/52 |
| 6,292,569 | B1 * | 9/2001 | Shear et al. | 380/255 |
| 6,341,373 | B1 * | 1/2002 | Shaw | 717/173 |
| 6,347,398 | B1 * | 2/2002 | Parthasarathy et al. | 717/178 |
| 6,463,535 | B1 * | 10/2002 | Drews | 713/176 |
| 6,618,769 | B1 * | 9/2003 | Bracha et al. | 719/332 |
| 6,618,855 | B1 * | 9/2003 | Lindholm et al. | 717/126 |
| 6,647,495 | B1 * | 11/2003 | Takeuchi et al. | 713/189 |
| 6,820,200 | B2 * | 11/2004 | Takeuchi et al. | 713/179 |
| 6,895,501 | B1 * | 5/2005 | Salowey | 713/168 |
| 6,950,932 | B1 * | 9/2005 | Lavian et al. | 713/151 |
| 6,976,163 | B1 * | 12/2005 | Hind et al. | 713/156 |
| 7,058,822 | B2 * | 6/2006 | Edery et al. | 726/22 |
| 7,171,558 | B1 * | 1/2007 | Mourad et al. | 713/168 |
| 7,346,901 | B2 * | 3/2008 | Syme et al. | 717/148 |
| 7,467,417 | B2 * | 12/2008 | Stillerman et al. | 726/30 |
| 7,539,868 | B2 * | 5/2009 | Balard et al. | 713/176 |
| 7,716,470 | B2 * | 5/2010 | Stillerman et al. | 713/156 |
| 7,739,514 | B2 * | 6/2010 | Bangui | 713/187 |
| 8,185,732 | B2 * | 5/2012 | Takashima | 713/156 |
| 8,190,910 | B2 * | 5/2012 | Takashima | 713/189 |
| 2004/0143814 | A1 * | 7/2004 | de Jong | 717/104 |
| 2008/0077801 | A1 * | 3/2008 | Ekberg | 713/187 |
| 2009/0210874 | A1 * | 8/2009 | Harris et al. | 718/1 |
| 2009/0307486 | A1 * | 12/2009 | Grajek et al. | 713/156 |
| 2011/0246778 | A1 * | 10/2011 | Duane | 713/176 |

FOREIGN PATENT DOCUMENTS

WO  WO0072149  11/2000

OTHER PUBLICATIONS

Leroy, "Java bytecode verification: algorithms and formalizations", Journal of Automated Reasoning, vol. 30-Issue 3-4, 2003, pp. 235-269.

Lundberg, "Application Development Using J2ME", Agder University College, Jul. 2005.

Sannella, "Mobile Resource Guarantees", APPSEM II, Mar. 27, 2003.

Yuan, "Securing wireless J2ME", Jun. 21, 2006, http://www-128.ibm.com/developerworks/wireless/library/wi-secj2me.html.

* cited by examiner

METHOD AND DEVICE FOR VERIFICATION OF CODE MODULE IN VIRTUAL MACHINE

TECHNICAL FIELD OF THE INVENTION

The present invention relates to techniques of verification of a code module executed in a virtual machine (VM), and specifically to a method and device for pre-verification of a code module when the code module is installed or updated in a virtual machine, a method and device for verification of a code module at runtime of the code module in a virtual machine, a method for running a code module in a virtual machine, and a virtual machine for running a code module.

BACKGROUND OF THE INVENTION

In the virtual machine, code modules, such as Java Applet program, OSGi (Open Service Gateway initiative) Bundle, Eclipse Plug-in and .Net Assembly etc., can be downloaded remotely from a possibly untrustworthy third party through network transmission and executed automatically on a local system without explicit installation or execution by a user. The increasingly dynamic character of the high-level language virtual machine-based execution environments such as Java, .Net CLR (Common Language Runtime) requires more secure mechanisms to protect the local virtual machine system from potentially malicious codes. To meet such a requirement, it is generally necessary to apply a method of code verification in the virtual machine which analyzes the structures or behaviors of the codes in accordance with a given security policy, such as type-safety rules, to assure correctness of the code semantics.

However, there exist the following problems in such method of code verification in the virtual machine:

1. This method of code verification is performed at the runtime of the code modules, which brings great impact on the performance of the code modules. For example, Java byte code verification takes 10-30% of program startup time, depending on the different execution scenarios.

2. The code verification takes place at every runtime of the code module no matter whether the code module is newly installed or not. Furthermore, despite the verification result, the verification result would be discarded at the end of the execution of the code module. Thus, the virtual machine learns no information from the previous run of the code module, and needs to verify the code module when the code module runs again. If the environment of the virtual machine is persistent, for example the same code files are deployed for a long time after the code module is downloaded, and the virtual machine just loads or re-loads the same codes over and over, it is quite unnecessary to verify the code module at every runtime.

3. When the code verification is performed, for example, when the type-safety of the codes is checked, the code verification may be executed across modules, i.e. the code verification may depend on the codes in other modules. So the codes in other modules which are dependent on the codes are required to be loaded. Since the dependencies are resolved based on code level, the inter-module code verification impedes the verification of one code module at a time at module level.

PCT application WO00/72149 "Pre-verification of Applications in Mobile Computing" discloses a method for pre-verification of applications in a mobile communication device, wherein a list including application programs and their digital fingerprints is pre-stored in the mobile communication device, and when a certain application program is to be executed, it is determined whether the application program can be executed by checking whether the digital fingerprint of the application program is present in the list. However, the method is the pre-verification on whether the application is authorized to run. It does not involve the code verification of the application program.

Therefore, an effective method for verification of the code modules in the virtual machine is extremely necessary to improve the startup and execution performance of the code modules at runtime.

SUMMARY OF THE INVENTION

The present invention is provided in view of the above technical problems. Its objectives include providing a method and device for pre-verification of a code module when the code module is installed or updated in a virtual machine, a method and device for verification of a code module at runtime of the code module in a virtual machine, a method for running a code module in a virtual machine, and a virtual machine for running a code module, to make the code verification performed only when the code module is installed or updated and store the verification result after the code verification is performed so that the virtual machine can remember the verification result, thus it is unnecessary for the code verification to be performed at every runtime of the code module and the runtime overhead caused by the code verification at the runtime of the code module would be reduced and the efficiency would be improved.

According to a first aspect of the present invention, a method for pre-verification of a code module when the code module is installed or updated in a virtual machine is provided, comprising: loading codes in the installed or updated code module; performing code verification on the codes in the code module; when the code verification is passed, generating a certificate of the code module; and storing the code module which passes the code verification and its certificate.

According to a second aspect of the present invention, a method for verification of a code module at runtime of the code module in a virtual machine is provided, comprising: loading codes in the code module; generating a certificate of the code module based on the loaded codes; when the generated certificate of the code module is identical with a pre-stored certificate of the code module, verifying the code module to be valid; and when the generated certificate of the code module is not identical with the pre-stored certificate of the code module, pre-verifying the code module with the above method for pre-verification of a code module when the code module is installed or updated in a virtual machine.

According to a third aspect of the present invention, a method for running a code module in a virtual machine is provided, comprising: performing the above method for verification of a code module at runtime of the code module in a virtual machine; and running the code module when the code module is verified to be valid.

According to a fourth aspect of the present invention, a device for pre-verification of a code module when the code module is installed or updated in a virtual machine is provided, comprising: a loader for loading codes in the installed or updated code module; a code verifier for performing code verification on the codes in the code module; a certificate generator for generating a certificate of the code module which passes the code verification; and a memory for storing the code module which passes the code verification and its certificate.

According a fifth aspect of the present invention, a device for verification of a code module at runtime of the code module in a virtual machine is provided, comprising: a device for pre-verification of a code module when the code module is installed or updated in a virtual machine; and a certificate verifier for verifying the certificate generated by the certificate generator for the code module; wherein, when the certificate verifier verifies the code module to be invalid, the code verifier verifies the codes in the code module.

According a sixth aspect of the present invention, a virtual machine for running a code module is provided, comprising: a device for verification of a code module at runtime of the code module in a virtual machine, wherein the code module is run only when the device verifies the code module to be valid.

According to a seventh aspect of the present invention, a program product embodied in a computer readable medium is provided comprising computer program code for performing steps of the above methods.

DETAILED DESCRIPTION OF THE INVENTION

It is believed that the above and other objectives, features and advantages of the present invention are more apparent with reference to the following detailed description of the specific embodiments of the present invention accompanied by the drawings.

Figure 1:
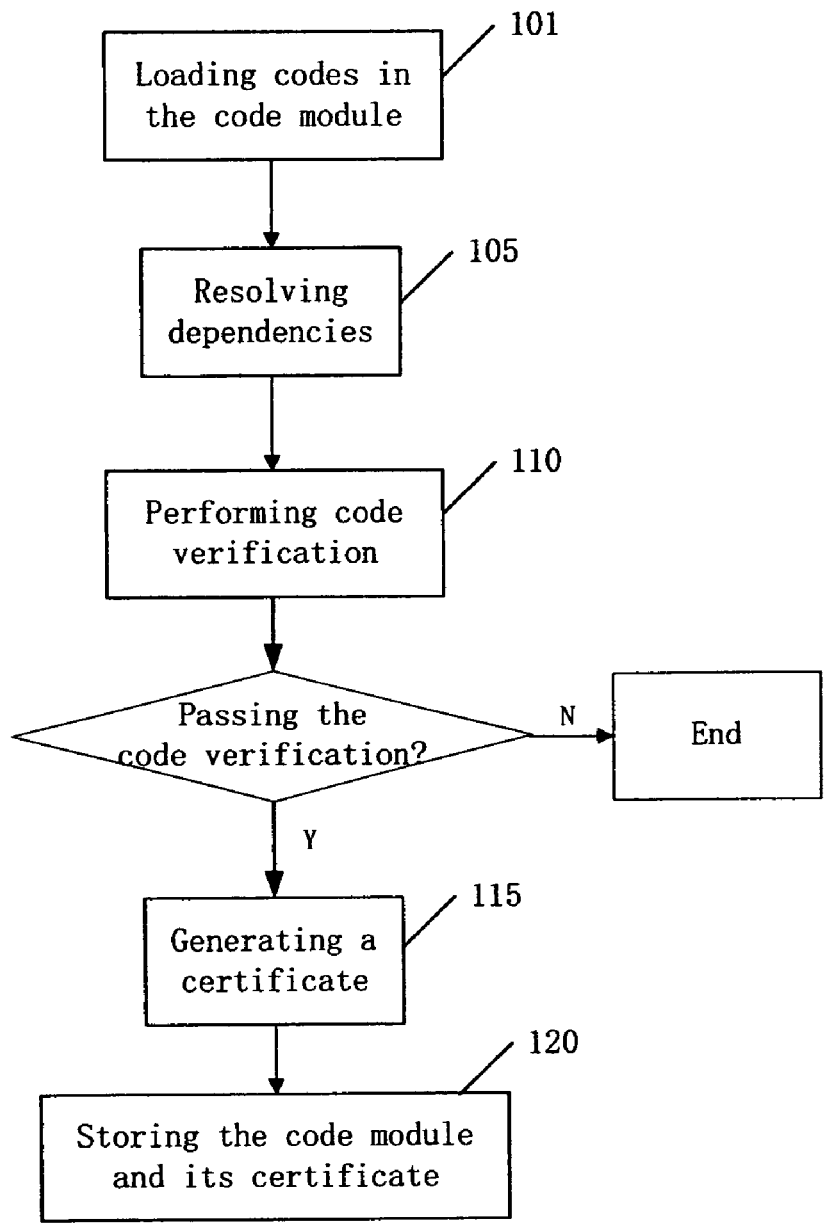
FIG. 1 is a flowchart of a method for pre-verification of a code module when the code module is installed or updated in a virtual machine according to an embodiment of the present invention.

FIG. 1 is a flowchart of a method for pre-verification of a code module when the code module is installed or updated in a virtual machine according to an embodiment of the present invention.

Generally, the code module includes pre-compiled code files (for example Java byte code, MSIL code etc.), a metadata or manifest file and other resources, wherein the manifest file is used to describe the contents of the code module. For instance, a Java-type code module includes Java class files, a manifest file describing the contents of a JAR file and providing information about the code module, and other resources. As described above, the code module may be downloaded from an untrusted source to the virtual machine via networks and then be installed on the virtual machine. In general, all kinds of operations on the code module can be represented with its lifecycle states.

As shown in FIG. 1, after the code module is installed or updated, at Step 101, the pre-compiled codes in the installed or updated code module are loaded.

Then, at Step 110, the code verification is performed on the codes. When the virtual machine loads the untrusted codes, the codes can be assured to be valid by the verification of the codes. For example, the codes never underflow or overflow the virtual machine stack, local variables are not used before initiation, etc.

The code verification can be a traditional code verification, such as byte code verification, and include at least one of the following checking process: checking grammar of the codes, i.e. checking whether the structures of the codes are correct; checking semantics of the codes, i.e. checking whether the codes comply with the corresponding language semantics; checking type-safety of the codes, i.e. checking whether the codes break the type-safety rule; and checking linkage of the codes, i.e. checking whether the codes violate the code loading constraints. It is certainly that extra codes can be loaded for verification. The above code verification is known for persons skilled in the art and does not need to be described in detail here.

In case that the code module is a Java class file, the verification of the Java class file includes four processes. Firstly, the class file is ensured to have a basic format of the class file, for example, the first four bytes must include correct magic numbers, the class file cannot be truncated at the end or have additional bytes, etc. Secondly, the verification on the code arrays without code properties is performed, for example it is checked whether each class has direct hyper-class, etc. Thirdly, code arrays of code properties are checked. Fourthly, the linkage of the class is checked. The detailed verification of the Java class file can be found in "Verification of Class File," Section 9, Chapter 4, "Java Virtual Machine Specification".

Next, at Step 115, if the code module passes the code verification, i.e. the code verification on the codes is successful, a certificate will be generated for the code module to indicate that the code module has been verified successfully.

In this embodiment, a digest generated for the code is regarded as the certificate of the code module. Many methods for generating the digest are known to persons skilled in the art, for example, MD5 (Message-Digest 5) algorithm is applied to the codes to generate hash codes and then the digest. Further, the generated digest can be further encrypted to ensure security of the certificate. Of course, persons skilled in the art know that other algorithms can also be used to generate the certificate of the code module.

If the code module does not pass the code verification, an error signal is generated and outputted, and this code module verification process is ended.

Then, at Step 120, the code module which passes the code verification and its certificate are stored. In order to enable the virtual machine to reuse the verification result, it is necessary to store the verification result. In this embodiment, the code module and its certificate can be stored separately and association information between the certificate and the corresponding code module is also stored. Alternatively, the certificate can be written into the code file of the code module as a property of the code module after the certificate of the code module is generated. Then, the code module which passes the code verification is stored.

In case that the code module and its certificate are stored separately, the certificate can be read out according to the code module and the stored association information. And in case that the certificate is written into the corresponding code file of the code module, the certificate can be read out by parsing the code file.

Further, in this embodiment, before the step of performing code verification on the code module (Step 110), the step (Step 105) of resolving dependencies between the installed or updated code module and other code modules is also included. In the code verification, both the type-safe check and the linkage check relate to the dependencies between code modules. Thus, it is necessary to resolve the dependencies between the code module and other code modules.

Resolving is a process at a connection wire between an importer (code module) and an exporter (code module), and also a constraint-solving process which can be described in terms of requirements on wiring relations. The wire is an actual connection between the importer and the exporter, and is associated with a plurality of constraints defined by the importer's and the exporter's manifest headers. A valid wire is a wire that has satisfied all the constraints. The particulars related to the resolving of the dependencies can be found in Parts 3.3.1, 3.4, 3.5 and 3.6 of the OSGi Core Specification R4, and are not described in detail here. However, it is known for persons skilled in the art to employ other methods for resolving the dependencies.

After the dependencies between the code module and other code modules are obtained, at Step 110, the code verifications are performed on the code module and all of its dependent code modules.

It can be seen from the above description that in the method for pre-verification of a code module when the code module is installed or updated in a virtual machine according to the embodiment of the present invention, the code verification is only performed when the code module is installed or updated and the verification result is stored so that the virtual machine can remember the verification result. In addition, this embodiment can resolve the dependencies between the code modules at module level so that the verification of one code module at one time can be performed at module level.

Figure 2:
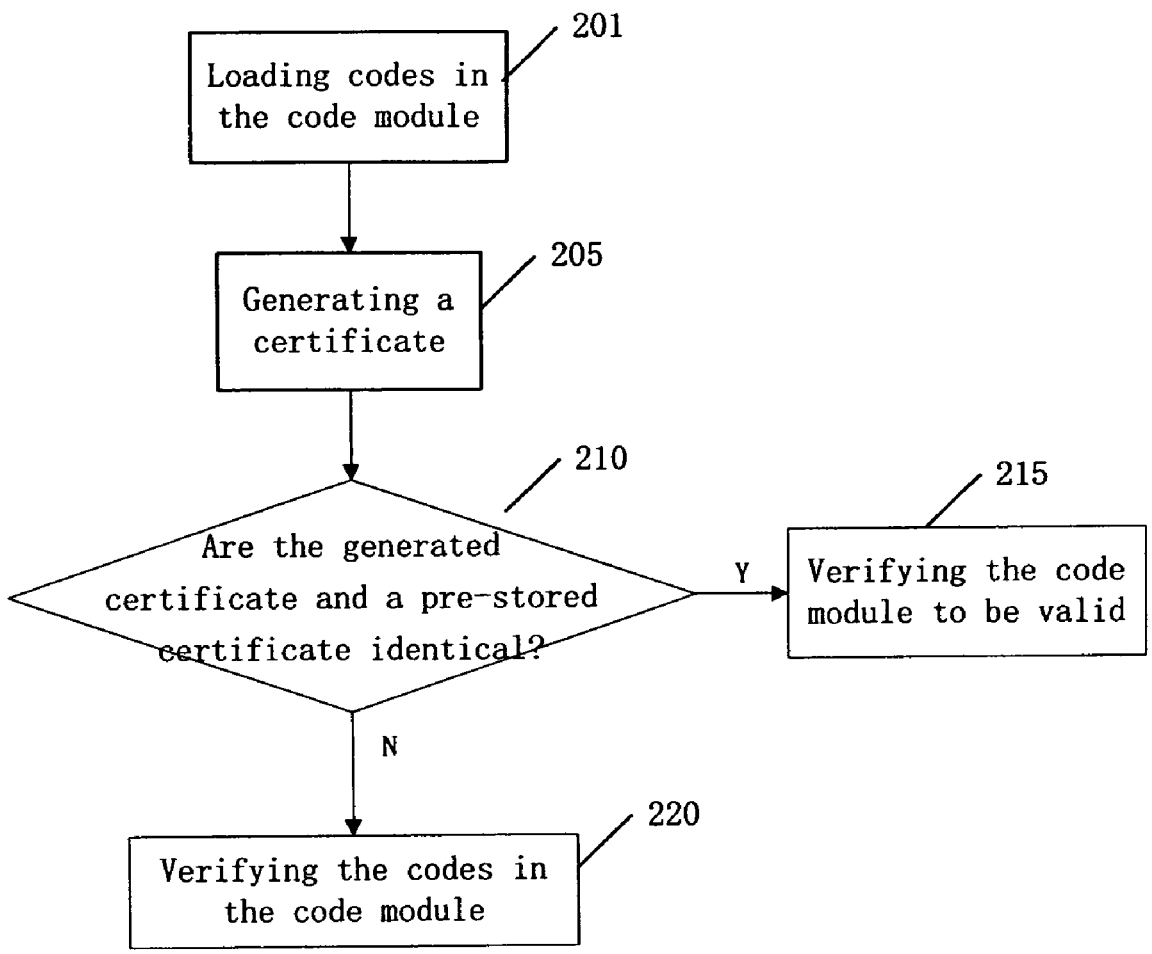
FIG. 2 is a flowchart of a method for verification of a code module at runtime of the code module in a virtual machine according to an embodiment of the present invention.

Under the same inventive concept, FIG. 2 is a flowchart of a method for verification of a code module at runtime of the code module in a virtual machine according to an embodiment of the present invention. This embodiment is described as below accompanying with the drawings. The description of the same parts as those in above embodiment is omitted properly.

As shown in FIG. 2, when the code module is run in the virtual machine, firstly at Step 201, the pre-compiled codes in the code module are loaded. The virtual machine can dynamically load the required codes for executing particular functions.

Next at Step 205, a certificate of the code module is generated based on the loaded codes, without code verification on the loaded code. The generation of the certificate is similar to the above process for generating a certificate in above Step 115, i.e. generating a digest for the codes as the certificate of the code module. Further, the generated digest can be encrypted to ensure the security of the certificate. In this embodiment, the digest can be generated by applying MD5 algorithm to the codes, and be encrypted by using AES algorithm. Of course, it is known for persons skilled in the art that other algorithms can be used.

Next, at Step 210, the certificate generated in Step 205 is compared with a pre-stored certificate of the code module to determine whether they are identical. When the virtual machine loads the codes in the code module, the corresponding pre-stored certificate can be read out according to the code module.

If the two certificates are identical, at Step 215, the code module is verified to be valid.

If the two certificates are not identical, the code module is verified to be invalid, indicating that the code module is modified or the pre-stored certificate of the code module is modified or the certificate does not exist or the dependent code modules are modified. Then at Step 220, the codes in the code module are verified by using the method for pre-verification of a code module when the code module is installed or updated in a virtual machine as described by the embodiment shown in FIG. 1 to ensure code security.

Before the code verification is performed on the code module which is verified to be invalid, it is also necessary to resolve the dependencies between the code module and other code modules and perform the code verification on the code module and its all dependent code modules. For example, if code module A is verified to be invalid and code module B depends on the code module A, when the code module A is re-verified, both the code module A and B must be verified.

It can be seen from the above description that in the method for verification of a code module at runtime of the code module in a virtual machine according to the present invention, the validness of the code module can be determined by verifying the certificate of the code module at the runtime of the code module, and the code verification is performed only on the code modules which are verified to be invalid and then the verification results are further stored. Since the verification results are stored in the virtual machine, it is unnecessary to perform the code verification at every runtime of the code module, thereby reducing the runtime overhead of the code module, shortening the startup time and improving the efficiency.

Under the same inventive concept, the present invention also provides a method for running a code module in a virtual machine. Firstly, the method for verification of a code module at runtime of the code module in a virtual machine as described by the embodiment shown in FIG. 2 is executed. And then when the code module is verified to be valid, the code module is run.

According to the method for running a code module in a virtual machine of the present invention, the validness of the code module can be determined by verifying the certificate of the code module at the runtime of the code module, and the code verification is performed only on the code module which is verified to be invalid, thereby simplifying the process of running the code module in the virtual machine, reducing the runtime overhead of the code module, shortening the startup time and improving the efficiency.

Figure 3:
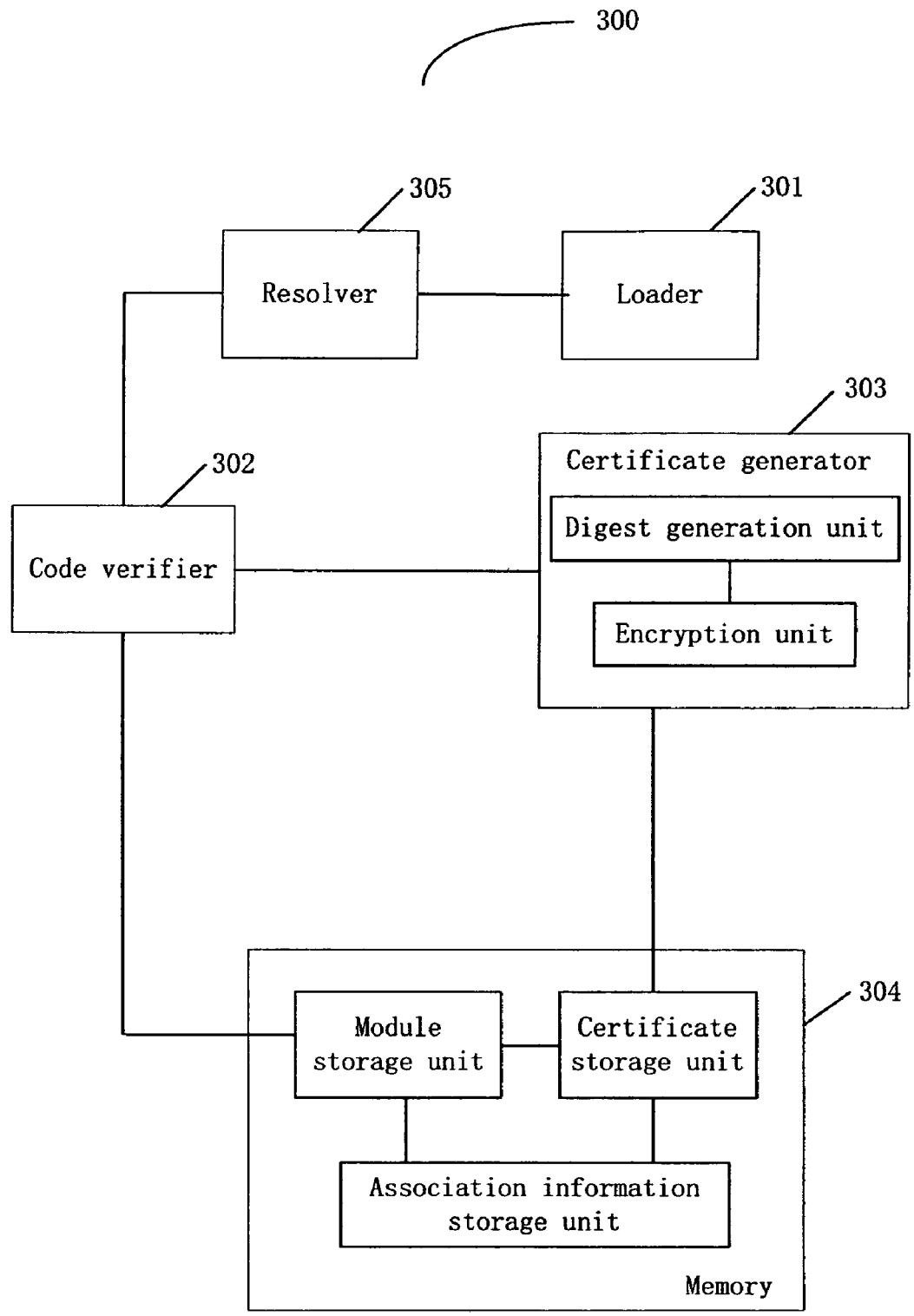
FIG. 3 is a schematic block diagram of a device for pre-verification of a code module when the code module is installed or updated in a virtual machine according to an embodiment of the present invention.

Under the same inventive concept, FIG. 3 is a schematic block diagram of a device for pre-verification of a code module when the code module is installed or updated in a virtual machine according to an embodiment of the present invention.

As shown in FIG. 3, the device 300 for pre-verification of the code module when the code module is installed or updated in the virtual machine of this embodiment includes: a loader 301 for loading codes in the code module; a code verifier 302 for performing code verification on the codes in the code module; a certificate generator 303 for generating a certificate for the code module which passes the code verification; and a memory 304 for storing the code module which passes the code verification and its certificate.

As mentioned above, the code module includes pre-compiled codes (for example, Java byte code, MSIL code etc.), a metadata or manifest file, and other resources, wherein the manifest file is used to describe the contents of the code module.

In this embodiment, after the code module is downloaded from the untrusted source and installed in the virtual machine, the codes of the code module are loaded into the virtual machine by the loader 301, and then the code verifier 302 verifies these codes.

In the code verifier 302, a grammar check unit is used to check whether the grammar of the codes is correct, a semantics check unit is used to check whether the semantics of the code is correct, a type-safety check unit is used to check whether the codes break the type-safety rule and a linkage check unit is used to check the linkage of the codes.

If the code module does not pass the code verification, the code verifier 302 outputs a code error signal.

If the code module passes the code verification, a certificate is generated in the certificate generator 303. In this embodiment, the certificate generator 303 includes a digest generation unit for generating the digest for the code module as the certificate of the code module. In this embodiment, the digest generation unit hashes the codes by applying MD5 algorithm to the codes, thereby generating the digest. Of course, other algorithms can be used to generate the digest.

Further, in order to ensure the security of the certificate, the certificate generator 303 also includes an encryption unit for encrypting the digest generated by the digest generation unit. In this embodiment, the encryption unit uses AES algorithm. Of course, it is known for persons skilled in the art that other algorithms can be used to encrypt the digest.

Then, the code module which passes the code verification and its certificates are stored in the memory 304. In this embodiment, the memory 304 includes a module storage unit for storing the code module which passes the code verification, a certificate storage unit for storing the certificate of the code module which passes the code verification, and an association information storage unit for storing association information between the certificate and the corresponding code module.

Further, in this embodiment, a resolver 305 is also included for resolving dependencies between the code module and other code modules before the code verifier 302 performs the code verification on the code module.

After the resolver 305 resolves the dependencies between the code module and other code modules, the code verifier performs the code verification on the code module and all of its dependent code modules. The type-safety check unit and linkage check unit in the code verifier 302 will use these dependencies to check.

The device 300 for pre-verification of a code module when the code module is installed or updated in a virtual machine and its components can be implemented by hardware circuit such as a Very Large Scale Integrated Circuit or gate array, semiconductor such as logic chips and transistors, or programmable hardware device such as field programmable gate array, programmable logic device, and by a combination of hardware and software executed by various types of processors.

It can be seen from above description that the device 300 for pre-verification of a code module when the code module is installed or updated in a virtual machine can perform the code verification once when the code module is installed or updated and store the pre-verification result so that the virtual machine can remember the pre-verification result to facilitate later use. In addition, this embodiment can resolve the dependencies at module level so that it can verify one code module at one time and facilitate the verification of the code module.

Figure 4:
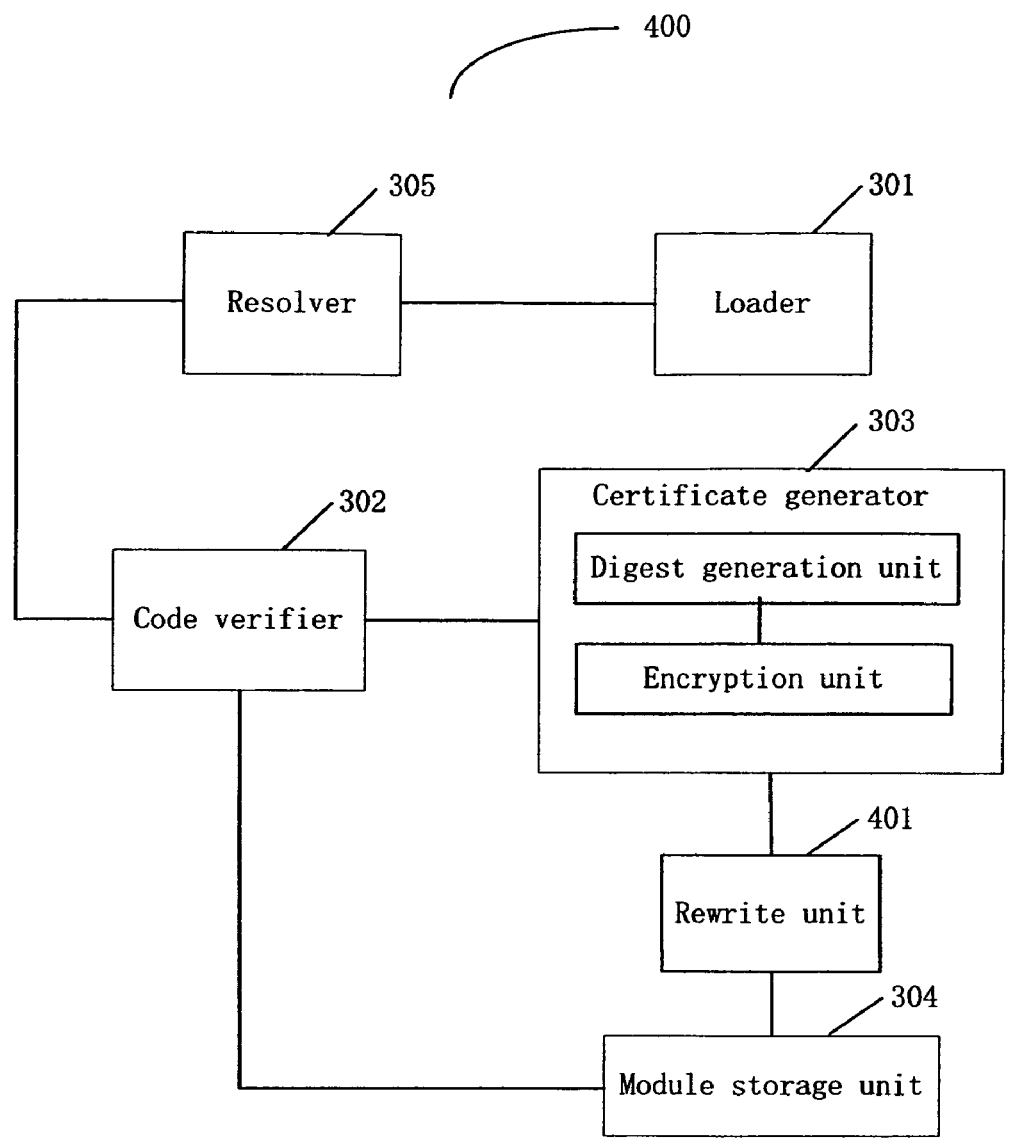
FIG. 4 is a schematic block diagram of a device for pre-verification of a code module when the code module is installed or updated in a virtual machine according to another embodiment of the present invention.

FIG. 4 is a schematic block diagram of a device for pre-verification of a code module when the code module is installed or updated in a virtual machine according to another embodiment of the present invention, wherein the same parts as those of the embodiment shown in FIG. 3 use the same reference numbers and their descriptions are omitted properly.

As shown in FIG. 4, the device 400 for pre-verification of a code module when the code module is installed or updated in a virtual machine further includes: a rewrite unit 401 for writing the certificate generated by the certificate generator 303 for the code module which passes the code verification into the code file of the code module as a property of the code module and outputting it to the memory 304.

In this case, the memory 304 can only include the module storage unit for storing the code module which passes the code verification and the code file which has been modified.

The device 400 for pre-verification of a code module when the code module is installed or updated in a virtual machine and its components can be implemented by hardware circuit such as a Very Large Scale Integrated Circuit or gate array, semiconductor such as logic chips and transistors or programmable hardware device such as field programmable gate array, programmable logic device, and by a combination of hardware and software executed by various types of processors.

It can be seen from above description that the device 400 for pre-verification of a code module when the code module is installed or updated in a virtual machine can store the certificate of the code module in the corresponding code file, thereby simplifying the structure of the memory.

Figure 5:
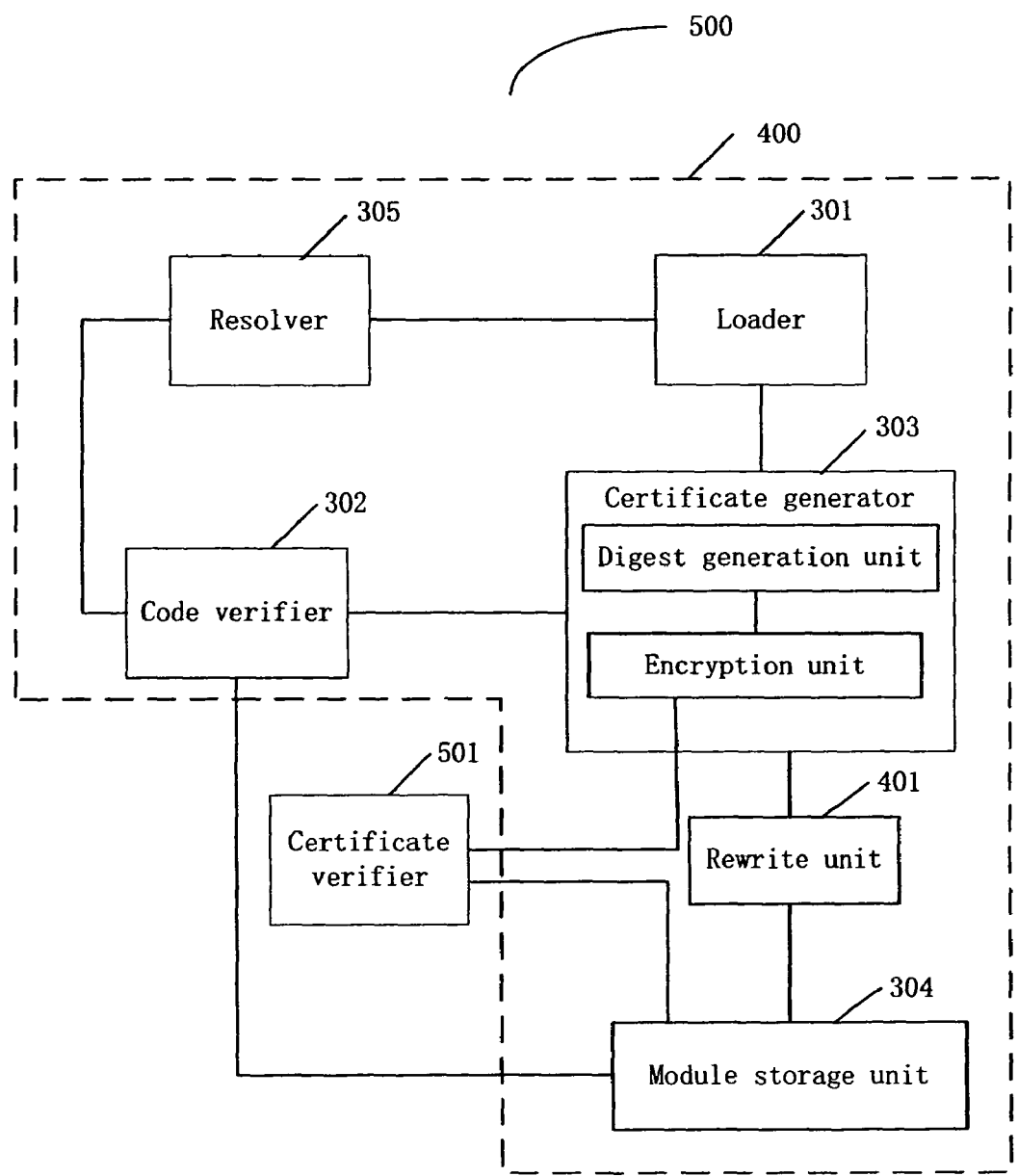
FIG. 5 is a block diagram of a device for verification of a code module at runtime of the code module in a virtual machine according to an embodiment of the present invention.

Under the same inventive concept, FIG. 5 is a block diagram of a device for verification of a code module at runtime of the code module in a virtual machine according to an embodiment of the present invention, wherein the same parts as those of the embodiments shown in FIGS. 3 and 4 use the same reference numbers and their description are omitted properly. Next, this embodiment is described in details with reference to the drawings.

As shown in FIG. 5, the device 500 for verification of a code module at runtime of the code module in a virtual machine includes: a device 300 or 400 for pre-verification of a code module when the code module is installed or updated in a virtual machine shown in FIG. 3 or 4; and a certificate verifier 501 for verifying the certificate generated by the certificate generator 303 for the code module according to the pre-stored certificate of the code module obtained from the memory 304. When the certificate verifier 501 verifies the code module to be invalid, the code verifier 302 performs code verification on the codes in the code module.

Specifically, when the code module is run in the virtual machine, the loader 301 loads the codes in the code module into the virtual machine, and then the certificate generator 303 generates the certificate of the code module based on the loaded codes and outputs the certificate to the certificate verifier 501. The certificate verifier 501 obtains the pre-stored certificate of the code module from the memory 304 and compares it with the certificate generated by the certificate generator 303 to verify whether the code module is valid or not.

In case of the device 300 for pre-verification of a code module when the code module is installed or updated in a virtual machine shown in FIG. 3, when obtaining the pre-stored certificate of the code module from the memory 304, the certificate verifier 501 firstly retrieves the code module from the module storage unit, then reads out the association information between the code module and the corresponding certificate from the association information storage unit, and finally gets the certificate of the code module from the certificate storage unit.

In case of the device 400 for pre-verification of a code module when the code module is installed or updated in a virtual machine shown in FIG. 4, when obtaining the pre-stored certificate of the code module from the memory 304, the certificate verifier 501 reads out the certificate of the code module from the code file by parsing the code file of the code module.

If the two certificates are identical, the certificate verifier 501 verifies the code module to be valid.

If the two certificates are not identical, the certificate verifier 501 verifies the code module to be invalid, i.e. it indicates that the code module is modified or the pre-stored certificate of the code module is modified or the certificate does not exist or the dependent code modules are modified.

For the code module which is verified to be invalid, the resolver 305 resolves the dependencies of the code module, and then the code verifier 302 verifies its codes. For example, if code module A is verified to be invalid by the certificate verifier 501 and the resolver 305 resolves and determines that code module B is dependent on code module A, then when code module A is verified, the code verifier 302 performs the code verification on both code modules A and B.

The device 500 for verification of a code module at runtime of the code module in a virtual machine and its components can be implemented by hardware circuit such as a Very Large Scale Integrated Circuit or gate array, semiconductor such as logic chips and transistors or programmable hardware device such as field programmable gate array, programmable logic device, and by a combination of hardware and software executed by various types of processors.

It can be seen from above description that the device 500 for verification of a code module at runtime of the code module in a virtual machine can determine the validness of the code module by verifying the certificate of the code module at the runtime of the code module and perform the code verification only on the code module which is verified to be invalid and further store the verification result so that only one code verification on the code module is necessary. Since the verification result of the code module is stored in the virtual machine, it is unnecessary to perform the code verification on the codes at every runtime of the code module, thereby reducing the runtime overhead of the code module, shortening the startup time and improving the efficiency.

Under the same inventive concept, the present invention also provides a virtual machine for running the code module, which comprises the device 500 for verification of a code module at runtime of the code module in a virtual machine shown in FIG. 5 and only when the device 500 verifies the code module to be valid, the virtual machine runs the code module.

The virtual machine for running a code module and its components can be implemented by hardware circuit such as a Very Large Scale Integrated Circuit or gate array, semiconductor such as logic chips and transistors or programmable hardware device such as field programmable gate array, programmable logic device, and by a combination of hardware and software executed by various types of processors.

It can be seen from above description that the virtual machine for running a code module can determine the validness of the code module by verifying the certificate of the code module at the runtime of the code module, and run the code module when the code module is determined to be valid, thereby simplifying the process of the virtual machine running the code module, reducing the runtime overhead of the code module and shortening the startup time and improving the efficiency.

Figure 6:
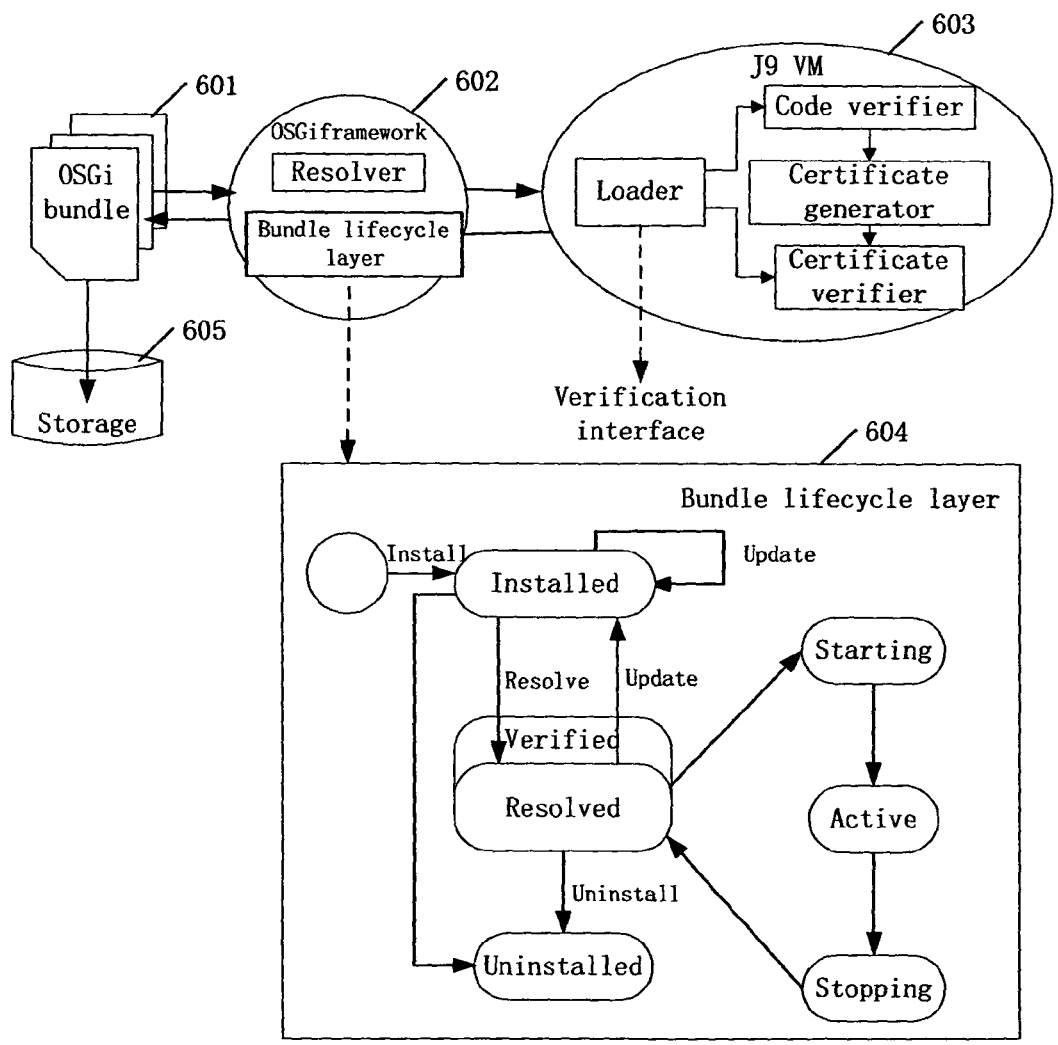
FIG. 6 is a schematic block diagram of the implementation of the device for verification of a code module at runtime of the code module in a virtual machine according to the embodiment of the present invention.

FIG. 6 is a schematic block diagram of the implementation of the device for verification of a code module at runtime of the code module in a virtual machine according to the embodiment of the present invention.

As shown in FIG. 6, the device for verification of a code module at runtime of the code module in a virtual machine according to the embodiment of the present invention is implemented based on the IBM's J9 virtual machine and Eclipse's OSGi component management framework. The OSGi framework 602 is a dynamic component runtime container and a service platform, which provides a general-purpose, secure Java framework and supports the deployment of extensible and downloadable applications such as an OSGi bundle 601. In the OSGi framework 602, the resolver in the embodiment of the present invention can be implemented. The OSGi bundle 601 is a unit of modularization representing a JAR file that is executed in the OSGi framework 602, which is equivalent to the code module in the embodiment of the present invention. The loader, certificate generator, certificate verifier and code verifier in the embodiment of the present invention can be implemented in the J9 virtual machine 603. A bundle lifecycle layer 604 provides a mechanism to control the security and the lifecycle operations of the bundle. It defines how a bundle is installed, updated, started, stopped and uninstalled. Storage 605 is equivalent to the memory in the embodiment of the present invention.

The OSGi bundle 601 can be downloaded from an untrusted source and installed in the OSGi framework 602, and the OSGi framework 602 is in "installed" state. When the J9 virtual machine 603 prepares for running the OSGi bundle 601, the loader in the J9 virtual machine 603 loads the class files of the OSGi bundle 601 into the local system and generates the certificate based on these class files. The J9 virtual machine 603 obtains the pre-stored certificate corresponding to the OSGi bundle 601 from the memory 605 and sends to the certificate verifier to verify the generated certificate. If the verification result is that the two certificates are identical, the OSGi bundle 601 is valid. Then the code verification on the OSGi bundle 601 is not performed and the OSGi bundle 601 is run. If the verification result is that the two certificates are not identical, the code verification on the OSGi bundle 601 is necessary.

When the OSGi bundle 601 is verified, firstly the resolver in the OSGi framework 602 resolves the dependencies of the OSGi bundle 601, and the bundle life-cycle layer 604 enter "resolved" state. After the dependencies of the OSGi bundle 601 are resolved successfully, the J9 virtual machine 603 performs the code verification on the OSGi bundle 601, i.e. all classes in the OSGi bundle 601 and other dependent code modules are verified. When the verification is passed, the certificate generator in the J9 virtual machine 603 applies MD5 algorithm to these class files to generate the hash codes, and then applies AES algorithm to the generated hash codes to obtain the encrypted certificate of the code module. At that time, the bundle life-cycle layer 604 enters a "verified" state. Then, the OSGi bundle 601 which passes the code verification and the generated certificate are stored in the storage 605 for next time use.

Although the method and device for verification of a code module in a virtual machine of the present invention are described in detail accompanying with the specified embodiment in the above, the present invention is not limited as above. It should be understood for persons skilled in the art that the above embodiments may be varied, replaced or modified without departing from the spirit and the scope of the present invention.

The invention claimed is:

1. A computer-implemented method for a virtual machine at a host computer executing on at least one processor to perform pre-verification of a code module received from an outside source when the code module is installed or updated in the virtual machine, comprising:

the virtual machine performing steps of:
loading codes in the installed or updated code module;
resolving dependencies between the code module and other code modules;
performing code verification on the codes in the code module and its dependent code modules; and
if the code verification is passed, generating a verification certificate of the code module; and
storing the code module which passes the code verification and its verification certificate in memory of the virtual machine.

2. The method of claim 1, wherein the step of performing the code verification comprises at least one of the following steps: checking grammar of the codes; checking semantics of the codes; checking type-safety of the codes; and checking linkage of the codes.

3. The method of claim 1, wherein the step of generating the certificate comprises: generating a digest for the code module as the certificate of the code module.

4. The method of claim 3, wherein the step of generating the certificate further comprises encrypting the generated digest.

5. The method of claim 1, wherein the storing step comprises: storing the code module which passes the code verification and its certificate separately; and storing association information between the certificate and the corresponding code module.

6. The method of claim 1 wherein the storing step comprises: storing the code module which passes the code verification, wherein the certificate is written into a code file of the code module as a property of the code module.

7. A computer-implemented method for a virtual machine executing on at least one processor at a host computer to perform verification of a code module at runtime of the code module in a virtual machine, comprising the steps of:

the virtual machine performing steps of:
loading codes in the code module received at the host computer from an outside source;
generating a generated certificate of the code module based on the loaded codes;
comparing the generated certificate to a pre-stored verification certificate;
if the generated certificate of the code module and a pre-stored certificate of the code module are identical, verifying the code module to be valid and permitting the code module to run; and
if the generated certificate of the code module and the pre-stored verification certificate of the code module are not identical, pre-verifying the code module using a method for pre-verification of a code module when the code module is installed or updated in the virtual machine by the steps of:
loading codes in the code module;
resolving dependencies between the code module and other code modules;
performing code verification on the codes in the code module and its dependent code modules;
if the code verification is passed, generating a verification certificate of the code module; and
storing the code module which passes the code verification and its verification certificate in memory of the virtual machine.

8. The method of claim 7 further comprising the step of running the code module if the code module is verified to be valid.

9. A device for a virtual machine executing on at least one processor at a host computer to perform pre-verification of a code module received from an outside computer source when the code module is installed or updated in the virtual machine, comprising:

a virtual machine executing on at least one processor and comprising:
a loader for loading codes in the code module;
a resolver for resolving dependencies between the code module and other code modules;
a code verifier for performing code verification on the codes in the code module, wherein the code verifier performs the code verification on the code module and its dependent code modules;
a certificate generator for generating a verification certificate of the code module which passes the code verification; and
a memory for storing the code module which passes the code verification and its verification certificate.

10. The device of claim 9, wherein the code verifier comprises at least one of the following units:
a grammar check unit for checking grammar of the codes;
a semantics check unit for checking semantics of the codes;
a type-safety check unit for checking type-safety security of the codes; and
a linkage check unit for checking linkage of the codes.

11. The device of claim 9, wherein the certificate generator comprises: a digest generation unit for generating a digest for the code module as the certificate of the code module.

12. The device of claim 11, wherein the certificate generator further comprises: an encryption unit for encrypting the digest generated by the digest generation unit.

13. The device of claim 9 further comprising: a rewrite unit for writing the verification certificate into a code file of the code module as a property of the code module.

14. The device of claim 9, wherein the memory comprises:
a module storage unit for storing the code module which passes the code verification;
a certificate storage unit for storing the verification certificate of the code module which passes the code verification; and
an association information storage unit for storing association information between the verification certificate and the corresponding code module.

15. A device for a virtual machine executing on at least one processor at a host computer to perform verification of a code module at runtime of the code module in a virtual machine, comprising:

a virtual machine executing on at least on processor and comprising:
a device for pre-verification of a code module when the code module is received from an outside computer source and installed or updated in a virtual machine comprising:
a loader for loading codes in the code module;
a resolver for resolving dependencies between the code module and other code modules;
a code verifier for performing code verification on the codes in the code module, wherein the code verifier performs the code verification on the code module and its dependent code modules;

a certificate generator for generating a verification certificate of the code module which passes the code verification; and a memory for storing the code module which passes the code verification and its verification certificate; and a certificate verifier for verifying a generated certificate of the code module generated by the certificate generator based on the loaded codes, wherein verifying a generated certificate is performed by comparing the generated certificate to a pre-stored verification certificate of the code module obtained from the memory;

wherein when the certificate verifier verifies the code module to be invalid when the comparing determines that the generated certificate does not match the pre-stored verification certificate, the code verifier of the device for pre-verification performs code verification on the codes in the code module.

16. A virtual machine executing on at least one processor for running a code module, comprising:

a device for verification of a code module at runtime of the code module in a virtual machine;

a device for pre-verification of a code module when the code module is installed or updated in a virtual machine comprising:

a loader for loading codes in the code module;

a resolver for resolving dependencies between the code module and other code modules;

a code verifier for performing code verification on the codes in the code module, wherein the code verifier performs the code verification on the code module and its dependent code modules;

a certificate generator for generating a verification certificate of the code module which passes the code verification; and a memory for storing the code module which passes the code verification and its verification certificate; and a certificate verifier for verifying a generated certificate of the code module generated by the certificate generator based on the loaded codes, wherein verifying a generated certificate is performed by comparing the generated certificate to a pre-stored verification certificate of the code module obtained from the memory;

wherein when the certificate verifier verifies the code module to be invalid, the code verifier performs code verification on the codes in the code module; and a processing component for running the code module only when the device verifies the code module to be valid.

* * * * *